E. W. DAVIS.
ADAPTER.
APPLICATION FILED JUNE 14, 1917.
1,294,333.
Patented Feb. 11, 1919.
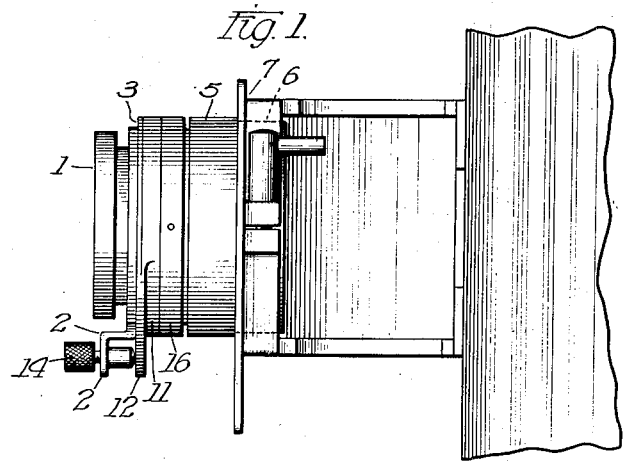
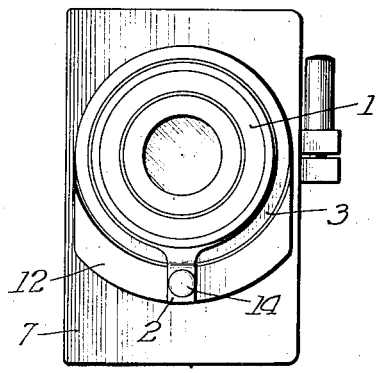
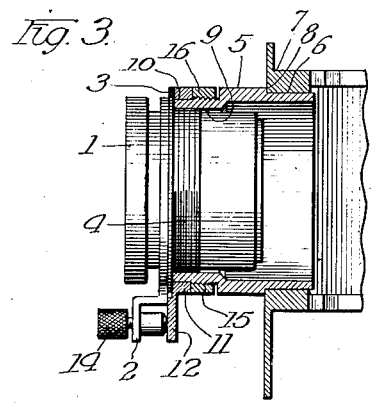

UNITED STATES PATENT OFFICE.

ERNEST W. DAVIS, OF CHICAGO, ILLINOIS, ASSIGNOR TO THE UNIVERSAL CAMERA CO., A CORPORATION OF ILLINOIS.

ADAPTER.

1,294,333.   Specification of Letters Patent.   Patented Feb. 11, 1919.

Application filed June 14, 1917. Serial No. 174,693.

*To all whom it may concern:*

Be it known that I, ERNEST W. DAVIS, a citizen of the United States, residing at Chicago, in the county of Cook and State of Illinois, have invented certain new and useful Improvements in Adapters, of which the following is a description.

My invention relates to means for attaching a photographic lens to a camera in suitable position in relation to the sensitive field in the camera.

The object of my invention is to provide a simple, convenient and reliable device of the kind described whereby if desired, the position of the lens mount may be slightly adjusted to accommodate the slight variations in focus of the lenses.

To this end my invention consists in the novel construction, arrangement and combination of parts herein shown and described and more particularly pointed out in the claims.

In the accompanying drawings wherein like or similar reference characters indicate like or corresponding parts—

Figure 1 is a side elevation of my improved adapter shown in its operative relation to the coöperating parts of a camera and lens mount.

Fig. 2 is a front elevation of the same.

Fig. 3 is a sectional view.

In the preferred form shown 1 is a lens mount of the usual or any desired form or construction having a projecting arm 2 adapted to be moved about the lens mount for adjusting the position of the lens longitudinally for focusing the same. A flange 3 is also provided upon the lens mount for accurately controlling the position of the mount in the adapter or other part for supporting the lens and suitable screw threads 4 are formed upon the mount near the flange 3 for rigidly locking the lens mount to the adapter or if preferred to some suitable stationary portion of the camera.

Obviously where it is desired to use a number of lenses of different focus with a camera it is desirable to provide an adapter with each lens so arranged that the several adapters may be quickly and conveniently interchanged upon the camera each having its particular lens mount rigidly secured thereto in position to bring each lens to its proper or desired position in relation to the camera when its particular adapter is properly attached to the camera.

My improved adapter comprises a tubular body part 5 of suitable size with a part 6 at one end formed to accurately fit the opening in the lens holder 7 of the camera. A shoulder 8 is also provided upon the body part 5 adjacent the part 6 and adapted to engage the front of the lens-holder 7 to accurately determine the longitudinal position of the adapter in the lens holder.

The opposite end of the body part 5 is of suitable size to receive the lens mount 1 and provided with suitable screw threads 9 near its end to coöperate with the screw threads 4 upon the lens mount to secure the lens mount to the body part 5.

In the preferred construction the length of the body part 5 from the shoulder 8 to the extreme end of the body part adjacent the lens mount is slightly less than the desired distance from the back of the flange 3 to the face of the holder 7 and a part 10 at the end of the body part 5 is suitably finished and a rotatable collar 11 having a laterally projecting flange 12 at one side is suitably fitted to the part 10 with the flange 12 positioned to coöperate with the binding screw 14 near the end of the arm 2 to rigidly lock the arm in its adjusted position.

Any suitable means may be provided to accurately control the position of the collar 11 longitudinally of the body part 5. As shown a portion 15 of the body part adjacent the part 10 is provided with suitable screw threads and a nut 16 is provided adapted to engage the screw threaded portion 15 and the inner margin of the collar 11 to accurately control the position of the collar 11 and thus the distance from the shoulder 8 to the face of the collar 11 which coöperates with the adjacent face of the flange 3 since it is obvious that the nut 16 may be operated to hold the collar 11 at any desired distance from the shoulder 8, after which the lens mount 1 may be screwed into the adapter in the usual manner bringing the flange 3 against the collar 11, thus rigidly holding the several parts in position.

Having thus described my improvement it is obvious that various immaterial modifications may be made in my device without departing from the spirit of my invention; hence I do not wish to be understood as limiting myself to the exact form or construction shown.

What I claim as new and desire to secure by Letters Patent is:

1. In an adapter, a tubular body, means upon said body adapted to coöperate with a lens mount and a camera to rigidly connect said lens mount to said camera, in combination with means rotatably mounted upon said body for adjusting the operative length of said body to control the position of said lens mount upon said camera.

2. In an adapter, a tubular body, means upon said body adapted to coöperate with a lens mount and a camera to rigidly connect said lens mount to said camera, in combination with a projecting flange rotatably attached to said body arranged to coöperate with means upon said lens mount to control the adjustment of said mount and means for adjusting the operative length of said body to control the position of said lens mount upon said camera.

3. In an adapter, a tubular body, means at the ends of said body and adapted to coöperate respectively with a lens mount and a camera to rigidly connect said lens mount to said camera, in combination with a projecting flange rotatably attached to said body and arranged to coöperate with means upon said lens mount to control the adjustment of said lens mount and means rotatably mounted upon said body for adjusting the operative length of said body to control the position of said lens mount upon said camera.

4. In an adapter, a tubular body, means at the respective ends of said body and adapted to coöperate respectively with a lens mount and a camera to rigidly connect said lens mount to said camera, in combination with a projecting flange rotatably attached to said body and arranged to coöperate with means upon said lens mount to control the adjustment of said lens mount and an annular member rotatably engaging a threaded portion of said body for adjusting the operative length of said body to control the position of said lens mount upon said camera.

5. In an adapter, a tubular body, means upon said body adapted to coöperate with a lens mount and a camera to rigidly connect said lens mount to said camera, in combination with a projecting flange rotatably attached to said body and arranged to coöperate with means upon said lens mount to control the adjustment of said lens mount and an annular member rotatably engaging a threaded portion of said body for adjusting the operative length of said body to control the position of said lens mount upon said camera.

In testimony whereof, I, have hereunto signed my name in the presence of two subscribing witnesses.

ERNEST W. DAVIS.

Witnesses:
 BLANCHE CHALMERS,
 BURTON U. HILLS.